(12) United States Patent
Herman et al.

(10) Patent No.: US 8,005,657 B2
(45) Date of Patent: Aug. 23, 2011

(54) SURVIVABILITY MISSION MODELER

(75) Inventors: Carl R. Herman, Owego, NY (US);
Stephen C. Moraites, Owego, NY (US);
James W. Jephson, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 614 days.

(21) Appl. No.: 12/108,356

(22) Filed: Apr. 23, 2008

(65) Prior Publication Data

US 2009/0271157 A1    Oct. 29, 2009

(51) Int. Cl.
*G06G 7/48* (2006.01)
*G06G 7/56* (2006.01)
(52) U.S. Cl. .................................. 703/8; 703/5; 703/6
(58) Field of Classification Search .................... 703/8, 6
See application file for complete search history.

(56) References Cited

U.S. PATENT DOCUMENTS

| | | | |
|---|---|---|---|
| 4,424,038 A | 1/1984 | Tingleff et al. | |
| 4,760,396 A | 7/1988 | Barney et al. | |
| 4,797,839 A | 1/1989 | Powell | |
| 4,812,990 A | 3/1989 | Adams et al. | |
| 4,947,350 A | 8/1990 | Murray et al. | |
| 4,959,015 A | 9/1990 | Rasinski et al. | |
| 5,404,516 A | 4/1995 | Georgiades et al. | |
| 5,421,728 A | 6/1995 | Milden | |
| 5,458,041 A | 10/1995 | Sun et al. | |
| 5,508,928 A * | 4/1996 | Tran ............................... | 342/13 |
| 5,572,213 A | 11/1996 | Noneman et al. | |
| 5,635,662 A | 6/1997 | Robertson et al. | |
| 5,787,333 A | 7/1998 | Rasinski et al. | |
| 5,838,262 A | 11/1998 | Kershner et al. | |
| 5,844,602 A | 12/1998 | Lareau et al. | |

(Continued)

FOREIGN PATENT DOCUMENTS

JP       2002195795 A        7/2002

OTHER PUBLICATIONS

Wikipedia, "Constructive analysis", Dated Jun. 11, 2006 (Printed Mar. 26, 2011), 2 pages.*

(Continued)

*Primary Examiner* — David Silver
(74) *Attorney, Agent, or Firm* — Miles & Stockbridge P.C.; James T. Carmichael; Stephen W. Aycock, II

(57) ABSTRACT

A method of determining survivability is disclosed. The method can include selecting a mission scenario and providing data associated with the scenario as input to a plurality of low-level modeling tools each associated with a corresponding spectrum, and performing a spectral analysis of the selected scenario using each of the low-level modeling tools for the corresponding spectrum. The method can also include generating an event probability matrix for each analyzed spectrum based on the output of the low-level model, the event probability matrix including a probability of detection, a probability of tracking, and a probability of engagement for each of a plurality of mission scenario reference points. Using the event probability matrix as input, a constructive analysis can be performed using a high-level simulation system configured to simulate actual event occurrence for a specific run of the mission scenario and a probability of survival based on a result of the constructive analysis can be determined. A report of the probability of survival, as well as other statistics relevant to operational performance and/or survivability can be provided as output.

20 Claims, 6 Drawing Sheets

U.S. PATENT DOCUMENTS

| | | | |
|---|---|---|---|
| 5,883,586 | A | 3/1999 | Tran et al. |
| 5,969,676 | A | 10/1999 | Tran et al. |
| 5,992,288 | A | 11/1999 | Barnes |
| 6,199,470 | B1 | 3/2001 | Dewan et al. |
| 6,222,464 | B1 | 4/2001 | Tinkel et al. |
| 6,231,003 | B1 | 5/2001 | Hibma et al. |
| 6,267,039 | B1 | 7/2001 | Czarnecki |
| 6,497,169 | B1 | 12/2002 | Khosla |
| 6,771,205 | B1 | 8/2004 | Barton et al. |
| 6,806,828 | B1 | 10/2004 | Sparrow et al. |
| 6,945,780 | B2 * | 9/2005 | Perry ............................ 434/11 |
| 6,997,715 | B2 * | 2/2006 | Perry et al. ..................... 434/11 |
| 7,516,052 | B2 * | 4/2009 | Hatcherson et al. ............. 703/6 |
| 2002/0150866 | A1 | 10/2002 | Perry et al. |
| 2003/0019350 | A1 | 1/2003 | Khosla |
| 2003/0142005 | A1 | 7/2003 | Bar-Avi et al. |
| 2003/0205126 | A1 | 11/2003 | O'Neill |
| 2003/0215771 | A1 | 11/2003 | Bartoldus et al. |
| 2004/0030463 | A1 | 2/2004 | Stockdale et al. |
| 2005/0038628 | A1 | 2/2005 | Beuttel et al. |
| 2005/0073439 | A1 | 4/2005 | Perricone |
| 2005/0195096 | A1 * | 9/2005 | Ward et al. ............... 340/995.14 |
| 2005/0256682 | A1 | 11/2005 | Galutia et al. |
| 2006/0000988 | A1 | 1/2006 | Stuart et al. |
| 2007/0236502 | A1 * | 10/2007 | Huang et al. .................. 345/473 |
| 2008/0206718 | A1 * | 8/2008 | Jaklitsch et al. ................ 434/12 |

OTHER PUBLICATIONS

Wikipedia, "Constructivism (mathematics)", Dated Mar. 29, 2008 (Printed Mar. 26, 2011), 5 pages.*

Monte Carlo Method from Wikipedia Oct. 3, 2006, 6 pages.

* cited by examiner

SURVIVABILITY MISSION MODELER

Embodiments of the present invention relate generally to determining survivability, and in particular to modeling mission survivability.

Military aircraft and rotorcraft face an increasingly lethal and proliferated multi-spectral threat from weapon mounted sensors. A need may exist to consider these weapons and their various capabilities at a design, engineering, or operational planning stage of a military aircraft or rotorcraft.

Embodiments of the present invention may provide a capability for analysis of survivability subsystem design and concept of operation (CONOPS) effectiveness. This can allow a quantitative comparison of overall platform design and recommended usage. Also, design validation and requirements verification of survivability subsystems typically requires a detailed understanding of specific aircraft mission operations. Costly post-development correction may be needed if an operational analysis is not performed at the outset of a system design or engineering effort. The operational analysis can provide a cost-effective approach to understanding survivability subsystem deign effectiveness in operational environments. Additionally, the cost and effectiveness of various design alternatives can be more easily compared using an operational analysis.

In general, embodiments of the present invention can use one or more high fidelity modeling tools to evaluate aircraft mission level survivability system performance. An event probability interface, including engagement/kill probabilities for one or more threats, can be used in a simulation (e.g., a monte carlo simulation) to simulate aircraft survivability through a number of specific missions. By running a statistically significant number of trials, overall probability of mission survival can be evaluated. In addition to providing a tool for survivability subsystem design and engineering efforts, the embodiments can be used to evaluate tactics, techniques, and procedures (TTPs) in order to find the most effective (i.e., survivable) way of flying a mission in a threat environment.

Thus, embodiments of the present invention can provide for a system level survivability performance analysis to be performed using results from one or more high-fidelity modeling tools. The resulting method, system or software can be used to evaluate mission-level performance and compare subsystem design issues. The methods, system, and software can provide a survivability modeling and simulation infrastructure that can be used in various aircraft and rotorcraft design and engineering programs. The survivability modeling methods, system and software can be used to demonstrate concepts, validate and shorten design cycles, and provide a cost-effective alternative to verification testing for subsystems, such as survivability subsystems.

While aircraft and rotorcraft are used as examples in this application for illustration purposes, it should be appreciated that the methods, systems and software of various embodiments can be used with military vehicles, spacecraft, commercial vehicles, private vehicles, unmanned aircraft and vehicles, autonomous machines or vehicles, and/or any type of machine or vehicle where a determination of survivability may be useful or desired. Vehicles, as used herein, is intended to refer to any type of transportation apparatus including, but not limited to, airplanes, helicopters, rockets, missiles, gliders, lighter-than-air craft, unmanned aerial vehicles (UAVs), cars, trucks, motorcycles, tanks, military ground transports, heavy equipment, naval vessels, watercraft, submarines, hover craft, human powered vehicles, and/or the like.

One exemplary embodiment can include a method of determining survivability. The method can include selecting a mission scenario and providing data associated with the scenario as input to a plurality of low-level modeling tools each associated with a corresponding spectrum, and performing a spectral analysis of the selected scenario using each of the low-level modeling tools and a low-level model for the corresponding spectrum. The method can also include generating an event probability matrix for each analyzed spectrum based on the output of the low-level model, the event probability matrix including a probability of detection, a probability of tracking, and a probability of engagement for each of a plurality of mission scenario reference points. Using the event probability matrix as input, a constructive analysis can be performed using a high-level simulation system configured to simulate actual event occurrence for a specific run of the mission scenario and a probability of survival based on a result of the constructive analysis can be determined. A report of the probability of survival can be provided as output.

Another exemplary embodiment can include a computer program product including a computer readable medium encoded with software instructions. When the software instructions are executed by a computer, they cause the computer to perform predetermined operations. The predetermined operations including the steps of selecting a mission scenario and providing data associated with the scenario as input to a low-level modeling tool associated with a corresponding spectrum; and performing a spectral analysis of the selected scenario using the low-level modeling tool and a low-level model for the corresponding spectrum. The steps can also include generating an event probability matrix for the analyzed spectrum based on the output of the low-level model, the event probability matrix including a probability of detection, a probability of tracking, and a probability of engagement for each of a plurality of mission scenario reference points. The steps can include performing a constructive analysis by providing the event probability matrix as input to a high-level simulation system configured to simulate actual event occurrence for a specific run of the mission scenario. The steps can include determining a probability of survival based on a result of the constructive analysis; and providing a report of the probability of survival as output.

Another exemplary embodiment can include a computer system for determining survivability. The computer system includes a processor and a memory including software instructions that are adapted to cause the computer system to perform a series of steps. The steps include selecting a mission scenario and providing data associated with the scenario as input to a low-level modeling tool associated with a corresponding spectrum, and performing a spectral analysis of the selected scenario using the low-level modeling tool and a low-level model for the corresponding spectrum. The steps can also include generating an event probability and performing a constructive analysis by providing the event probability matrix as input to a high-level simulation system configured to simulate actual event occurrence for a specific run of the mission scenario. The steps can include determining a probability of survival based on a result of the constructive analysis, and providing a report of the probability of survival as output.

BRIEF DESCRIPTION OF THE DRAWINGS

Exemplary embodiments of the present invention will be described with reference to the accompanying drawings, wherein.

DETAILED DESCRIPTION

Figure 1:
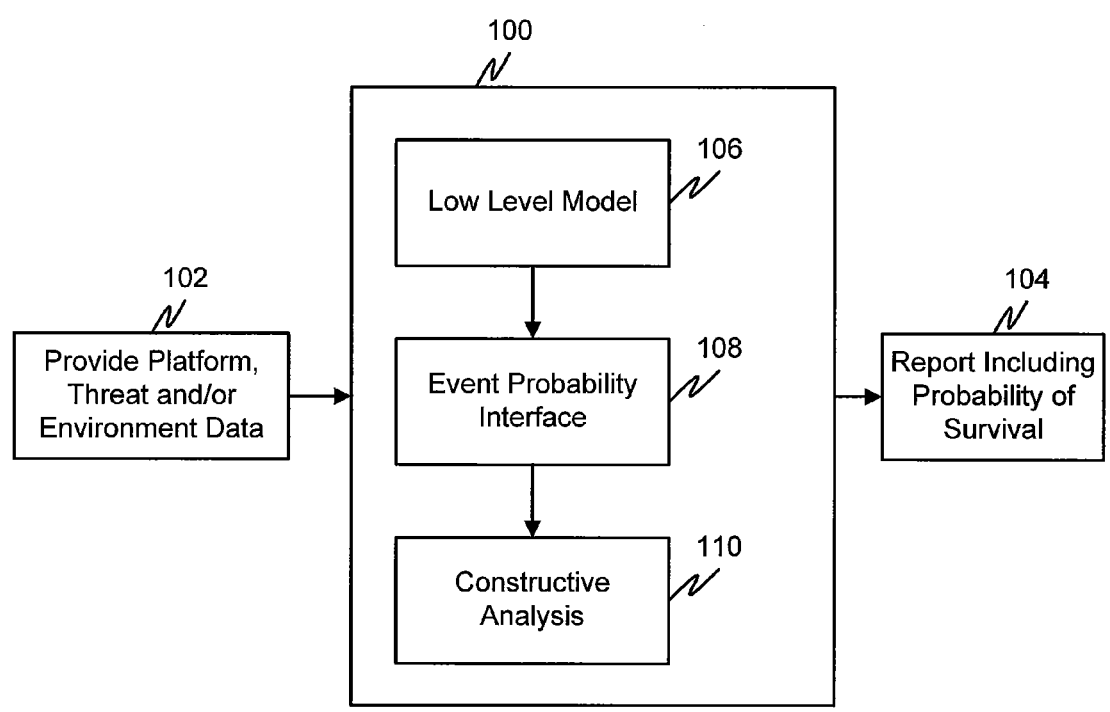
FIG. 1 is a block diagram of an exemplary system for modeling mission survivability.

FIG. 1 is a block diagram of an exemplary system for modeling mission survivability. In particular, a mission survivability modeling system 100 receives input data 102 and outputs a report 104 including a probability of survival. The mission survivability modeling system includes a low-level model 106, an event probability interface 108, and a constructive analysis module 110.

In operation, the system 100 receives input 102. The input 102 can include platform, threat, and/or environment data. Using the input 102, the system 100 can use a low-level model 106 to model mission survivability for a particular threat type. The low-level model can be a verified, validated and accredited modeling tool for a particular type of sensor technology, for example, radar or infrared. This allows for a detailed simulation of a mission scenario for a given threat type and/or sensor technology.

The low-level model 106 can produce an event probability interface 108 that represents one or more probabilities for each of a plurality of intervals distributed along the course of the mission. The intervals can be based on distance, time, position, and/or a combination of the above.

The event probability interface 108 can include probabilities of detection ($P_D$), tracking ($P_T$), and engagement ($P_E$). The event probability interface can include a distribution of engagement ($D_E$) for each interval. The event probability interface can also include a probability of a hit given a weapon fire ($P_{H/S}$) and a probability of a kill given a hit ($P_{K/H}$). All of the above probabilities can be based on an aspect (i.e., an orientation) of the aircraft being simulated, geometry of the engagement, a position of a threat, a capability of the aircraft being analyzed, and a capability of the threat.

For example, the probability event interface can include a probability of engagement for each interval on the mission scenario. The $P_E$ for each interval can be determined based on the aspect of the aircraft, the location of the threat, and the capability of the threat.

The event probability interface 108 is provided as input to a constructive analysis module 110. The constructive analysis module can be a module of an integrated program for mission survivability modeling or can be a standalone application such as a simulation software tool. The constructive analysis module 110 can determine a contribution of danger of each type of threat for an entire mission. By using highly detailed information for a threat type from the low-level model 106, the constructive analysis module is able to provide a probability of survival that incorporates the accuracy of the low-level model 106 for a particular threat type.

The constructive analysis module 110 produces an output report 104 that can include a probability of survival. The report 104 can be provided in any of a variety of forms including printed, shown on a video display, as audio, as an entry in database, as an electronic communication, and/or the like. The particular method of providing the report 104 can depend on the contemplated use of the embodiment.

The report 104 can be used to evaluate mission performance and inform subsystem design choices. The report 104 can also be used for mission planning purposes. The report 104 can include an overall probability of survival and/or a probability of survival for each of the intervals of the mission. By representing probabilities distributed over intervals of a mission, the system can determine, for example, at which points in a mission an aircraft is most vulnerable and from what type of threat. This information can be used in a design activity, for example to alter a design of a survivability system to better protect the aircraft, or a mission planning activity, for example changing a recommended flight aspect at a certain interval of the mission based on an indicated probability of survival for that interval.

Trade studies can be performed using the system 100. For example, a mission scenario can be simulated in which a first scenario includes an aircraft equipped with "Subsystem A" and a second scenario includes an aircraft equipped with "Subsystem B." By using the system 100 to output a survivability report 104 based on each of the scenarios, the effectiveness of Subsystems A and B can be compared and a design choice can be made using the comparison result. In another example, a mission scenario survivability simulation can be performed with an aircraft being equipped with a particular subsystem, and another mission scenario survivability simulation can be performed with the aircraft not being equipped with the particular subsystem. The results of these simulations can be used tom compare the effectiveness of the particular subsystem.

It should be appreciated that system 100 can be comprised of computer software, electronic and/or computer hardware, or a combination of the above.

Figure 2:
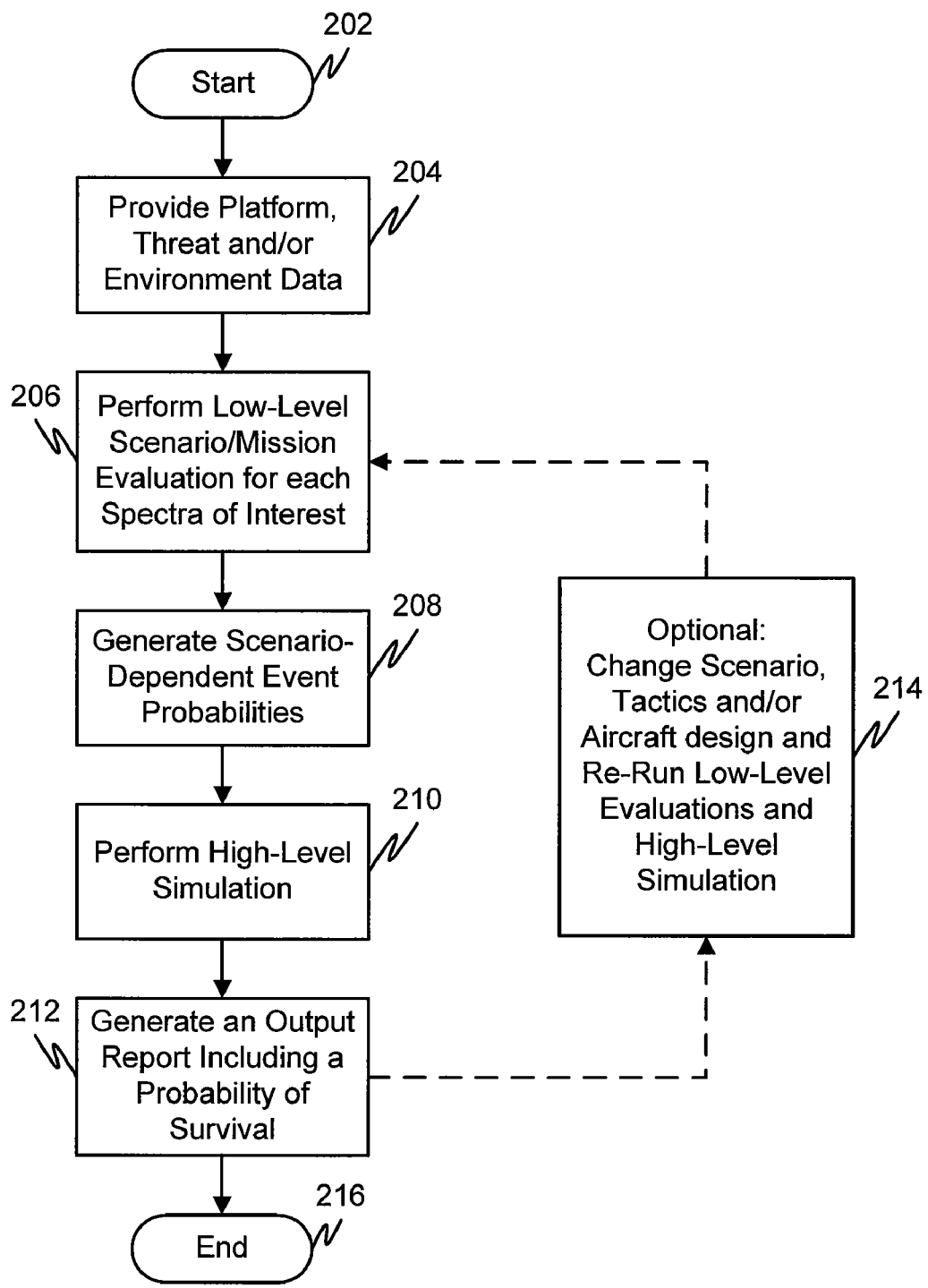
FIG. 2 is a flowchart of an exemplary method for modeling mission survivability.

FIG. 2 is a flowchart of an exemplary method for modeling mission survivability. The method begins at step 202 and continues to step 204.

In step 204, platform, threat, and/or environmental data can be provided. The method continues to step 206.

In step 206, a low-level simulation or modeling can be performed using a low-level modeling tool that may be adapted for a specific threat and/or sensor technology type. Control then continues to step 208.

In step 208, scenario-dependent event probabilities can be generated by the low-level modeling tool. These event probabilities can be output using the event probability interface described above and below. Control then continues to step 210.

In step 210, a high-level simulation can be performed. Inputs to the high-level simulation can include any event probability interfaces produced by the low-level modeling tool. Inputs can also include some or all of the data provided to the low-level modeling tool, such as platform, threat, environment, mission information, and/or the like. Control continues to step 212.

In step 212, an output report can be generated that can include a probability of survival for the mission. The output report can also include other information as described below in reference to FIG. 6. Control then continues, optionally to step 214 or, if not to step 214 then to step 216 where the method ends.

In optional step 214, one or more parameters of a scenario or mission can be changed and the low-level and high-level simulations performed again. The changed parameters can relate to any aspect of the mission including, but not limited to, tactics, aircraft design (or platform configuration), threat capability, threat location, mission route, or the like. Performing a simulation with different parameters can provide an ability to compare survivability outcomes using different mission parameters.

Figure 3:
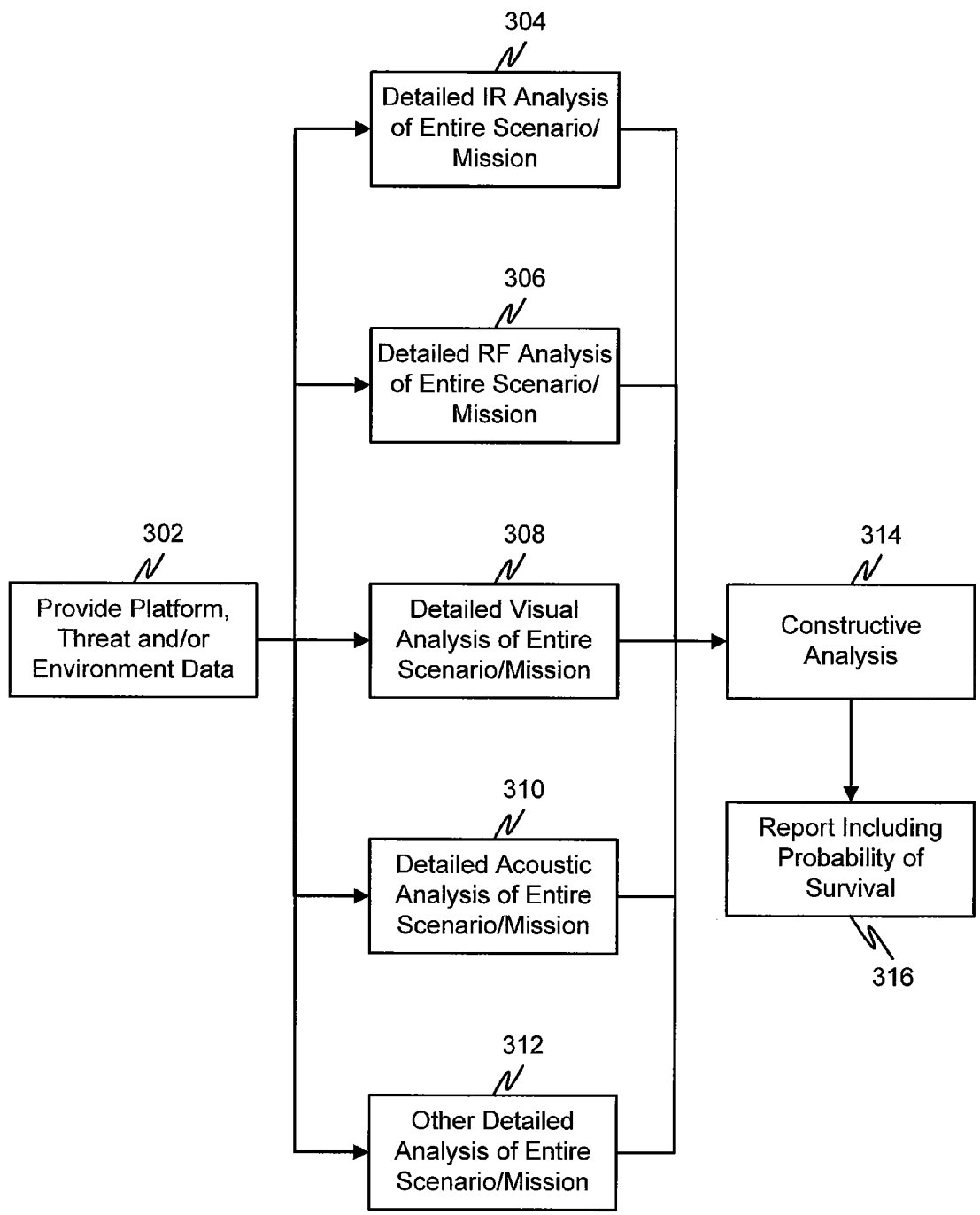
FIG. 3 is a block diagram of an exemplary process for modeling mission survivability including a plurality of low-level models.

FIG. 3 is a block diagram of an exemplary process for modeling mission survivability including a plurality of low-level models. In particular, platform, threat, and/or environment data 302 can be provided. The data 302 can be used as input to a plurality of low-level modeling tools. The low-level modeling tools can include, for example, infrared (IR) 304, radio frequency (RF) 306, visual 308, acoustic 310, or other 312 type of low-level model now in use or later-conceived. The low-level models can be selected based on a contemplated mission or scenario, the types of threats that may be encountered, and the platform that may be used for the mission. It should be appreciated that the low-level modeling tools 304-312 shown in FIG. 3 are for illustration purposes and more or less low-level modeling tools of the same or different type can be used with the embodiment. Further, the embodiment may be used with low-level modeling tools for existing technologies or threats and may also be used with low-level modeling tools developed for future technologies or threats not presently known.

The low-level modeling tools 304-312 can provide a detailed analysis of a portion or all of a mission or scenario. The detailed analysis can include an assessment of various probabilities at each interval along the mission. The intervals may be predetermined or determined dynamically based on mission or scenario parameters.

The results of the low-level modeling tools 304-312 can be output as a set of event probabilities in an event probability interface. These event probability interfaces can be used as input to a constructive analysis tool 314 (e.g., a simulation tool such as Satellite Tool Kit® sold by Analytical Graphics, Inc. of Exton, Pa.).

The constructive analysis tool 314 can use the event probability interfaces to generate a report 316 that can include an overall probability of survival for the mission based on each of the low-level modeling tools.

Figure 4:
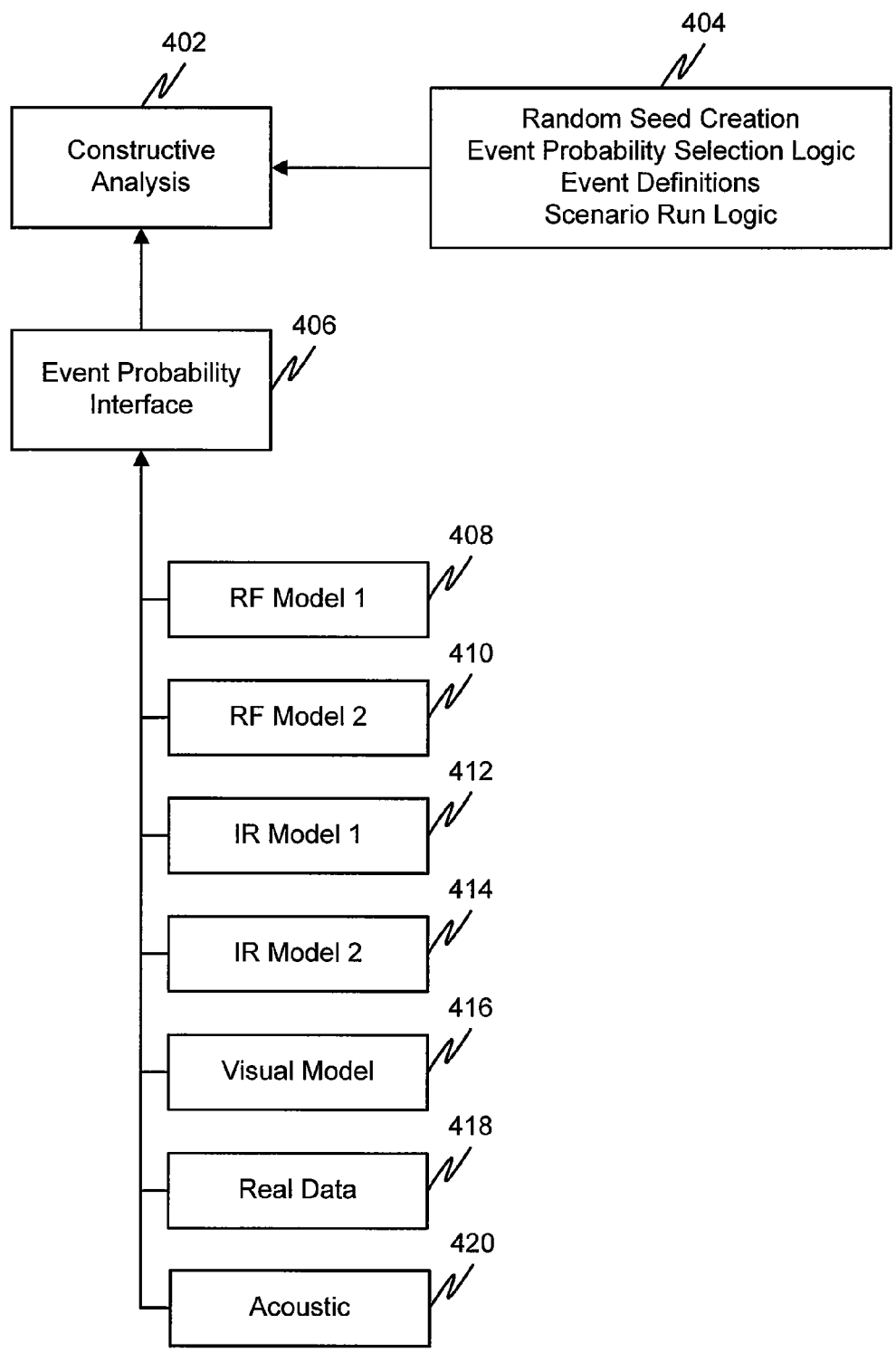
FIG. 4 is a bock diagram showing inputs to an exemplary constructive analysis.

FIG. 4 is a bock diagram showing inputs to an exemplary constructive analysis. In particular, a constructive analysis module 402 can receive input from a number of sources. These sources can include low-level modeling tools, interface definitions, and other parameters. The parameters 404 can include, for example, random seed creation parameters, event probability selection logic, event definitions, scenario run logic, and/or the like. The interface definitions can include an event probability interface 406. The low-leveling modeling tools can include RF models 408 and 410, IR models 412 and 414, a visual model 416, an actual or real data model 418 and an acoustic model 420.

In operation, the low-level modeling tools 408-420 can output data in the same or different formats. The output data can be provided or conformed to the event probability interface 406. The event probability interface 406 can be an interface definition usable by the constructive analysis module 402 and the low-level models 408-420. The interface and data can be in a text format, binary format, or other format, such as extensible markup language (XML). In general, any computer readable format may be used for the event probability interface 406 and data provided by the low-level models 408-420.

Using the above inputs, the constructive analysis module 402 can perform a high level mission survivability simulation and output a report of the results of the simulation. The constructive analysis module 402 can be a stand alone program or a program integrated with the low-level models.

Figure 5:
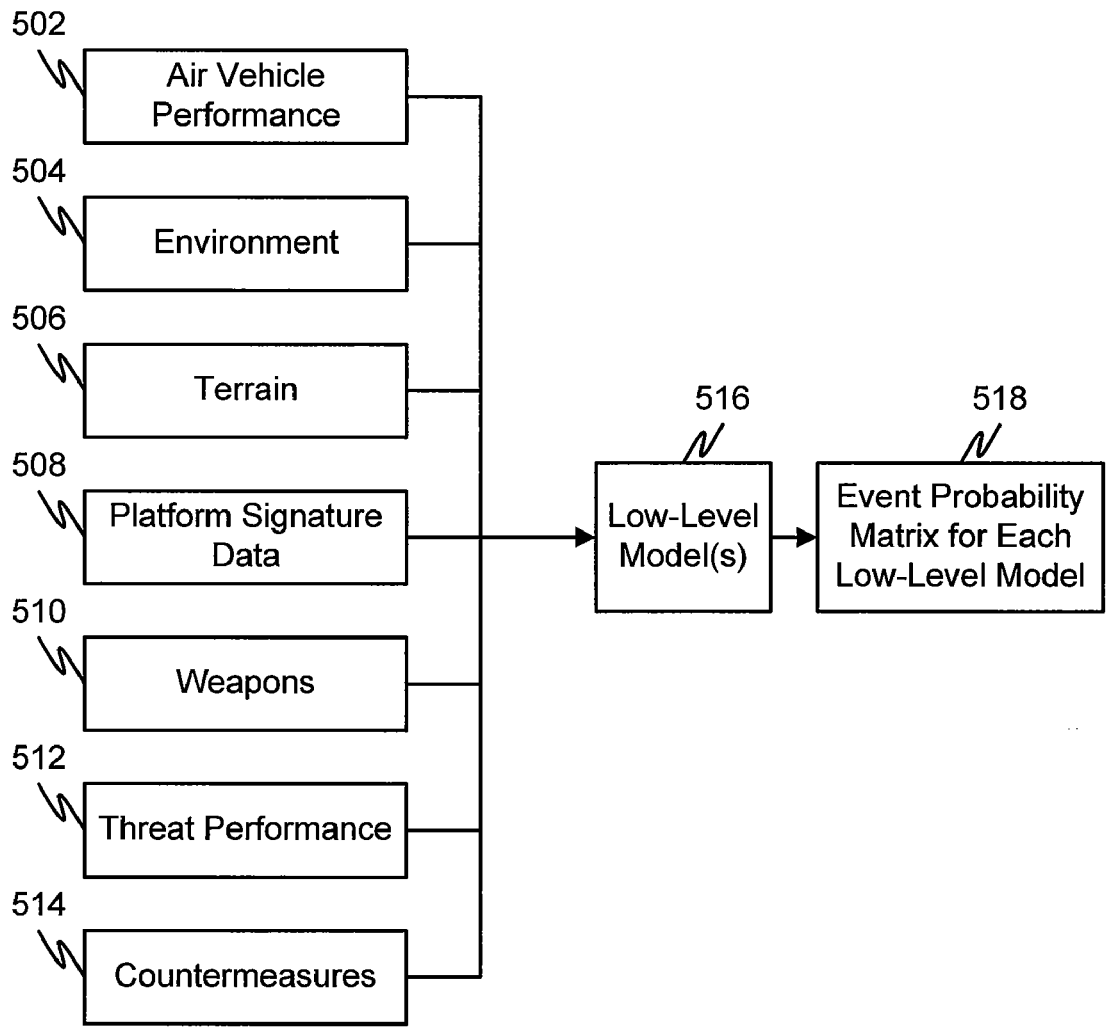
FIG. 5 is a block diagram showing inputs to exemplary low level models.

FIG. 5 is a block diagram showing inputs to exemplary low level models. The low-level models may require various input data in order to perform the low-level analysis of a mission or scenario. This input data can include air vehicle (or other type of vehicle or craft) performance data 502, environment data 504, terrain data 506, platform signature data 508, threat weapons data 510, threat performance data 512, platform countermeasure data 514, and/or the like.

In operation, the inputs 502-514 can be provided to one or more low-level models 516. Each of the low-level models can then produce an event probability matrix, or event probability interface 518. As mentioned above, these event probability interfaces can be provided to a high-level or constructive analysis, module for performing a survivability modeling, analysis or simulation of some or all of a mission or scenario.

Figure 6:
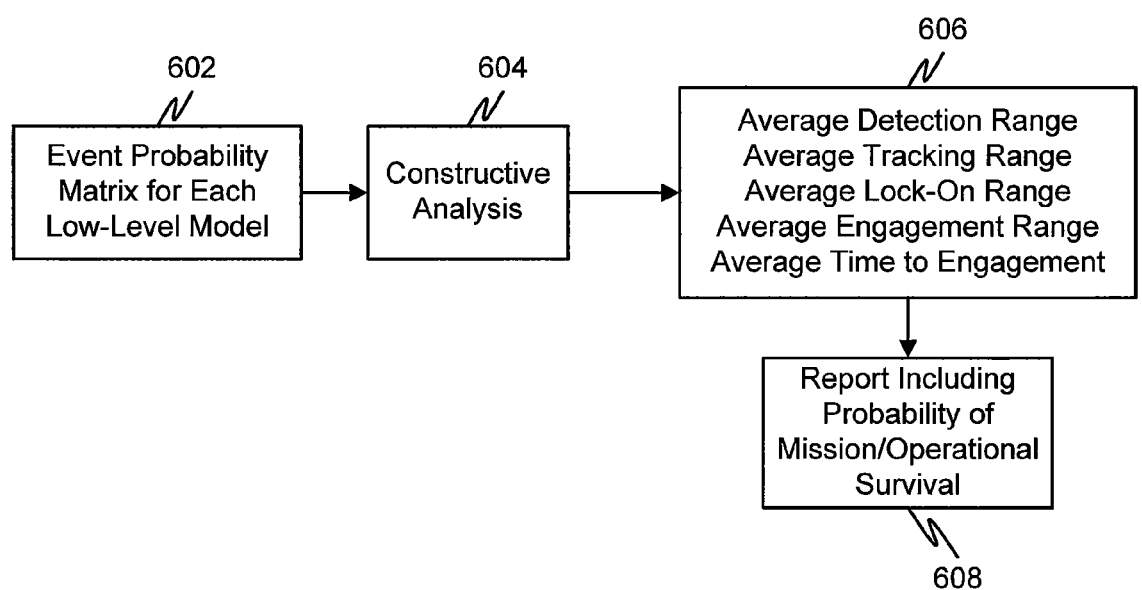
FIG. 6 is a block diagram showing output results from an exemplary constructive analysis.

FIG. 6 is a block diagram showing output results from an exemplary constructive analysis. In particular, an event probability matrix, or event probability interface, 602 can be provided to a constructive analysis module 604. The constructive analysis module can perform a high-level simulation using the low-level event probability interface inputs and produce an output report. The output report can list a probability of survival 608 for some or all of a mission or scenario. The output report can also include other information 606 that may have factored into the probability of survival. The other information 606 can include an average detection range, an average tracking range, an average lock-on range, an average engagement range, an average time-to-engagement range, and/or the like.

It should be appreciated that any steps described above may be repeated in whole or in part in order to perform a contemplated mission survivability modeling task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Embodiments of the method, system and computer program product for modeling mission survivability, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for modeling mission survivability.

Furthermore, embodiments of the disclosed method, system, and computer program product for modeling mission survivability may be readily implemented, fully or partially, in software using, for example, object or object-oriented software development environments that provide portable source code that can be used on a variety of computer platforms. Alternatively, embodiments of the disclosed method, system, and computer program product for modeling mission survivability can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for modeling mission survivability can be implemented in hardware and/or software using any known or later developed systems or structures, devices and/or software by those of ordinary skill in the applicable art from the functional description provided herein and with a general basic knowledge of the computer and/or simulation arts.

Moreover, embodiments of the disclosed method, system, and computer program product for modeling mission survivability can be implemented in software executed on a programmed general-purpose computer, a special purpose computer, a microprocessor, or the like. Also, the modeling mission survivability method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for modeling mission survivability into a software and/or hardware system.

It is, therefore, apparent that there is provided in accordance with the present invention, a method, system, and computer program product for modeling mission survivability. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method of determining survivability comprising:
   selecting a first mission scenario for a vehicle and providing data associated with the first mission scenario as input to a plurality of low-level modeling tools each associated with a unique corresponding spectrum;
   performing a first spectral analysis of the first mission scenario using each of the low-level modeling tools and a low-level model for each unique corresponding spectrum;
   generating a first event probability matrix for each unique analyzed spectrum based on output of the corresponding low-level model, the first event probability matrix including a first probability of detection, a first probability of tracking, and a first probability of engagement for each of a plurality of first mission scenario reference points;
   performing a first constructive analysis by providing the first event probability matrix as input to a high-level simulation system configured to simulate actual event outcome for a first mission scenario simulation run;
   determining a first probability of survival based on a result of the first constructive analysis;
   providing as output a first report based on the determining of the first probability of survival;
   selecting a second mission scenario for the vehicle and providing data associated with the second mission scenario as input to the plurality of low-level modeling tools each associated with a different corresponding spectrum;
   performing a second spectral analysis of the second mission scenario using each of the low-level modeling tools and a low-level model for each different corresponding spectrum;
   generating a second event probability matrix for each different analyzed spectrum based on output of the low-level model, the second event probability matrix including a second probability of detection, a second probability of tracking, and a second probability of engagement for each of a plurality of second mission scenario reference points;
   performing a second constructive analysis by providing the second event probability matrix as input to a high-level simulation system configured to simulate actual event outcome for a second mission scenario simulation run;
   determining a second probability of survival based on a result of the second constructive analysis; and
   providing as output a second report based on the determining of the second probability of survival.

2. The method of claim 1, wherein the first mission scenario reference points are different than the second mission scenario reference points.

3. The method of claim 1, wherein the first mission scenario employs a first vehicle configuration and the second mission scenario employs a second vehicle configuration, different than the first vehicle configuration.

4. The method of claim 1, further comprising planning a mission including recommending an operational aspect for the vehicle at one of the first or second mission scenario reference points, the operational aspect being recommended in response to the first and second determined probabilities.

5. The method of claim 1, wherein the vehicle comprises an aircraft.

6. The method of claim 5, wherein the aircraft is a helicopter.

7. The method of claim 1, wherein each of the low-level modeling tools is accredited for a unique vehicle detection technology selected from the group consisting of a radio frequency technology, an infrared technology, a visual technology, an acoustic technology, and a technology based on actual data gathered externally.

8. The method of claim 1, wherein the first and second mission scenario reference points comprise time points during the first and second mission scenarios, respectively.

9. The method of claim 1, wherein the first and second mission scenario reference points comprise positional locations along a route of the first and second mission scenarios, respectively.

10. The method of claim 1, further comprising performing a monte carlo simulation.

11. A computer program product comprising:
    a computer readable medium encoded with software instructions that, when executed by a computer, cause the computer to perform predetermined operations, the predetermined operations including the steps of:
    selecting a mission scenario and providing data associated with the scenario as input to a low-level modeling tool associated with a corresponding spectrum;
    performing a spectral analysis of the selected scenario using the low-level modeling tool and a low-level model for the corresponding spectrum;
    generating an event probability matrix for the analyzed spectrum based on the output of the low-level model, the event probability matrix including at least one of a probability of detection, a probability of tracking, and a probability of engagement for each of a plurality of mission scenario reference points;
    performing a constructive analysis by providing the event probability matrix as input to a high-level simulation system configured to simulate actual event occurrence for a specific run of the mission scenario;
    determining a probability of survival based on a result of the constructive analysis; and
    providing a report of the probability of survival as output.

12. The computer program product of claim 11, wherein the steps further comprise planning operations using the probability of survival.

13. The computer program product of claim 11, wherein the steps further comprise performing a subsystem engineering activity using the probability of survival as an input to the activity.

14. The computer program product of claim 11, wherein the low-level modeling tool is accredited for a specific technology.

15. The computer program product of claim 14, wherein the specific technology includes one of a radio frequency technology, an infrared technology, a visual technology, an acoustic technology, and a technology based on actual data gathered externally.

16. A computer system for determining survivability, said computer system comprising:
a processor; and
a memory including software instructions adapted to cause the computer system to perform the steps of:
selecting a mission scenario and providing data associated with the scenario as input to a low-level modeling tool associated with a corresponding detection technology;
performing an analysis of the selected scenario using the low-level modeling tool and a low-level model for the corresponding detection technology;
generating an event probability matrix;
performing a constructive analysis by providing the event probability matrix as input to a high-level simulation system configured to simulate actual event outcome for a specific run of the mission scenario;
determining a probability of survival based on a result of the constructive analysis; and
providing a report of the probability of survival as output,
wherein generating the event probability matrix includes:
determining possible mission scenario reference points where a threat event can occur;
determining an event probability for each mission scenario reference point where an event can occur; and
determining an event outcome for each mission scenario reference point based on a probability of detection, tracking and engagement at that mission scenario reference point, the event outcome determined by a probability of a hit given an engagement and a probability of a kill given a hit.

17. The computer system of claim 16, wherein the detection technology includes one of a radio frequency technology, an infrared technology, a visual technology, an acoustic technology, and a technology based on actual data gathered externally.

18. The computer system of claim 16, wherein the mission scenario includes one of a vehicle configuration, a vehicle flight profile, a vehicle ground track, a threat position, a threat type, and a terrain description.

19. The computer system of claim 16, wherein the data associated with the scenario include at least one of air vehicle performance data, ground vehicle performance data, environment data, terrain data, platform signature data, weapons data, threat performance data, and countermeasure data.

20. The computer system of claim 16, wherein the low-level modeling tool is associated with a corresponding spectrum.

* * * * *